United States Patent [19]

Hansen et al.

[11] 4,378,969
[45] Apr. 5, 1983

[54] FLUID FORMULATIONS OF OXIDATION DYES FOR MINERAL OIL PRODUCTS, FATS AND WAXES

[75] Inventors: Guenter Hansen, Ludwigshafen; Hans J. Kolbinger, Gruenstadt; Rudolf Senninger, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 260,273

[22] Filed: May 6, 1981

[30] Foreign Application Priority Data

Jun. 2, 1980 [DE] Fed. Rep. of Germany ....... 3020891

[51] Int. Cl.³ ............................................... D06P 3/00
[52] U.S. Cl. .......................................... 8/521; 8/406; 8/416; 8/421; 8/649; 564/305; 564/443
[58] Field of Search .................. 8/649, 521, 416, 421, 8/406; 564/443, 305

[56] References Cited

U.S. PATENT DOCUMENTS

| | | | |
|---|---|---|---|
| 923,635 | 2/1906 | Erdmann | 8/406 |
| 2,684,893 | 7/1954 | Hughes et al. | 260/45.9 QB |
| 3,200,040 | 8/1965 | Lange | 8/409 |
| 3,415,608 | 12/1968 | Tucker | 8/416 |
| 3,819,708 | 6/1974 | Manning | 424/316 |
| 3,884,627 | 5/1975 | Brody et al. | 8/410 |
| 3,936,445 | 2/1976 | Pfitzner et al. | 260/239 DD |
| 3,981,677 | 9/1976 | Halasz et al. | 8/416 |
| 4,000,135 | 12/1976 | Kast | 544/80 |
| 4,152,112 | 5/1979 | Busaut et al. | 8/410 |
| 4,277,244 | 7/1981 | Busaut et al. | 8/410 |

FOREIGN PATENT DOCUMENTS 1025916 4/1966 United Kingdom .
1482170 1/1974 United Kingdom .

OTHER PUBLICATIONS

J. F. Corbett, "Hair Dyes" in Venkataraman's, "The Chemistry of Synthetic Dyes,"vol. V, (Academic Press) 1971, pp. 475-534.

*Primary Examiner*—A. Lionel Clingman
*Attorney, Agent, or Firm*—Oblon, Fisher, Spivak, McClelland & Maier

[57] ABSTRACT

Fluid formulations of oxidation dyes, which are obtained by oxidizing a compound of the general formula I

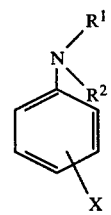

where
$R^1$ is unsubstituted or hydroxy-, $C_1$–$C_8$-alkoxy- or $C_1$–$C_8$-alkanoyloxy-substituted $C_2$–$C_{13}$-alkyl,
$R^2$ is hydrogen or unsubstituted or hydroxy- or $C_1$–$C_8$-alkoxy-substituted $C_1$–$C_{13}$-alkyl and
X is hydroxyl, amino or

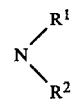

in an organic solvent, are particularly suitable for dyeing mineral oil products, fats and waxes.

7 Claims, No Drawings

FLUID FORMULATIONS OF OXIDATION DYES FOR MINERAL OIL PRODUCTS, FATS AND WAXES

The present invention relates to fluid formulations of dyes which are obtained by oxidizing a compound of the general formula I

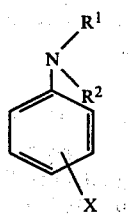

where
- $R^1$ is unsubstituted or hydroxy-, $C_1$–$C_8$-alkoxy- or $C_1$–$C_8$-alkanoyloxy-substituted $C_2$–$C_{13}$-alkyl,
- $R^2$ is hydrogen or unsubstituted or hydroxy- or $C_1$–$C_8$-alkoxy-substituted $C_1$–$C_{13}$-alkyl and
- X is hydroxyl, amino or

in an organic solvent.

Particularly suitable organic solvents to use in preparing the fluid formulations are alcohols, hydrocarbons, halohydrocarbons, amides, ketones and nitriles. Specific examples are methanol, ethanol, propanol, isopropanol, butanol, isobutanol, methoxypropanol, acetonitrile, methyl n-propyl ketone, dipropyl ketone, toluene, xylenes, alkylbenzene mixtures (for example the solvents available under the trademark ®Shellsol), chlorobenzene, dimethylformamide, N-methylpyrrolidone and paraffin oil, and, preferably, β-ethylhexanol.

Preferred oxidizing agents are oxygen and especially air, and they are advantageously employed in the presence of a catalyst, for example one of the compounds described in German Laid-Open Applications DOS 2,333,925 and DOS 2,427,606.

Specific examples of radicals $R^1$ are:

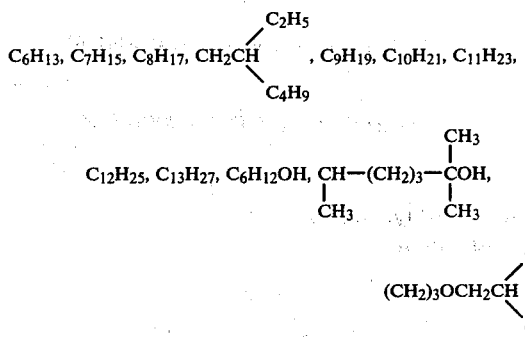

and $CH_2CH_2OCOC_7H_{15}$.

The above formulae include both the normal and the iso-compounds.

Examples of $R^2$ are the same radicals as above, as well as methyl. Compounds in which $R^1$ and $R^2$ together contain not less than 6 carbon atoms are preferred.

Further preferred compounds are those in which one of the radicals $R^1$ and $R^2$ is hydrogen, and compounds in which X is hydroxyl or amino.

The novel fluid formulations are advantageously prepared by dissolving a compound of the formula I in an organic solvent, preferably an alcohol, adding the catalyst and then passing air through the mixture until starting material is no longer detectable by thin layer chromatography. Reaction temperatures of about 20°–100° C., preferably 40°–60° C., are advantageous. The reaction time is as a rule from 4 to 20 hours. After the oxidation, the solvent can be distilled off, preferably under reduced pressure, and be replaced by whatever solvent is most suitable for the envisaged end use. It is of course also possible to use this solvent from the start, ie. also in the oxidation reaction, if it has proved suitable in preliminary experiments.

The use of a low-boiling solvent can be advantageous, since any desired concentration can easily be obtained by distilling off solvent.

The oxidation reactions can as a rule be carried out in highly concentrated solutions, for example of from 20 to 80% strength; in some cases it even proves possible to manage without any solvent.

The fluid formulations according to the invention are suitable for dyeing mineral oil products, fats and especially waxes, for example shoe polish. Essentially, the hues obtainable are shades of brown.

Fluid formulations obtainable from starting compounds of the formula

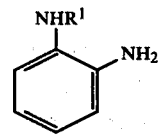

are of particular importance. In this formula, $R^1$ is preferably

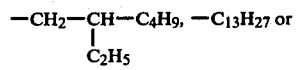

In the Examples which follow, parts and percentages are by weight, unless stated otherwise.

EXAMPLE 1

1 part of the Fe complex of dihydrodibenzotetraaza[14]-annulene is added to a solution of 22.0 parts of N-(2-ethylhexyl)-o-phenylenediamine in 100 parts of isopropanol, the reaction mixture is heated to about 50° C. and a slight stream of air is passed through it, with vigorous stirring. After about 5 hours, starting material is no longer detectable by thin layer chromatography. The catalyst is then removed by filtration or decanting, and the solvent is distilled off, preferably under reduced pressure. The residue is very easily soluble in hydrocarbons and is therefore, in the form of an about 70% strength solution in toluene, exceptionally suitable for dyeing shoe polish.

The phenylenediamine derivatives mentioned in the Table below can be converted to oxidation products, having similar properties, by a method similar to that of Example 1.

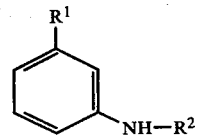

| Example | R¹ | R² | R³ | Hue |
|---------|----|----|-----|-----|
| 2 | H | H | —CH₂(CH₂)₆CH₃ | brown |
| 3 | H | H | —C₁₃H₂₇ | " |
| 4 | H | H | CH₃(CH₂)₃CHC₂H₅ | " |
| 5 | H | H | —(CH₂)₃OC₁₃H₂₇ | " |
| 6 | H | H | —C₂H₄OCOC₇H₁₅ | " |
| 7 | H | —CH₂CHC₄H₉ / C₂H₅ | —CH₂CHC₄H₉ / C₂H₅ | " |
| 8 | H | H | —CH(CH₂)₃C(CH₃)(CH₃)—OH | " |

EXAMPLE 9

29.1 parts of 3-tridecylamino-phenol are dissolved in 100 parts of isobutanol and oxidized by a method similar to Example 1. After distilling off the solvent, a solid product is obtained, which, in the form of an about 60% strength solution in Shellsol AB (aromatic mixture, boiling point 180°–210° C., dyes waxes and shoe polish, which give very glossy dark brown hues on leather.

The phenylenediamine derivatives and aminophenol derivatives mentioned in the Table below can be converted to oxidation products, having similar properties, by a method similar to that of Example 9.

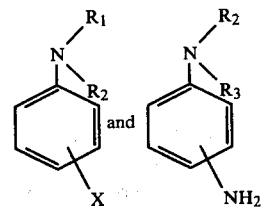

| Example | R¹ | R² | Hue |
|---------|-----|-----|-----|
| 10 | —NHCH₂CHC₄H₉ / C₂H₅ | —CH₂CHC₄H₉ / C₂H₅ | brown |
| 11 | —NHC₁₃H₂₇ | —C₁₃H₂₇ | yellowish brown |
| 12 | OH | —CH₂CHC₄H₉ / C₂H₅ | yellowish brown |
| 13 | OH | —C₁₃H₂₇ | yellowish brown |
| 14 | OH | —(CH₂)₃OC₁₃H₂₇ | yellowish |

-continued

| Example | R¹ | R² | Hue |
|---------|----|----|-----|
| | | | brown |

USE EXAMPLE 10 parts of the dye of Example 1 and 75 parts of mineral spirit are stirred, at about 80° C., into 25 parts of a wax mixture containing 8% of OP-Wachs from BASF, 2% of AL 61-Wachs from BASF, 1% of ozokerite, 13% of paraffin wax, 52°/54° C. and 76% of mineral spirit. After cooling, a dark brown, very glossy shoe polish is obtained.

We claim:

1. A fluid formulation of an oxidation dye which is obtained by oxidizing a compound selected from the group consisting of:

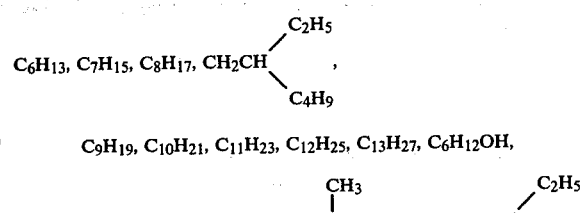

(I)     (II)

wherein
  $R_1$ is unsubstituted or hydroxy-, $C_1$–$C_8$-alkoxy-, or $C_1$–$C_8$-alkanoyloxy-substituted $C_2$–$C_{13}$-alkyl,
  $R_2$ is hydrogen or unsubstituted or hydroxy- or $C_1$–$C_8$-alkoxy-substituted $C_1$–$C_{13}$-alkyl,
  $R^3$ is selected from the group consisting of $$C_6H_{13}, C_7H_{15}, C_8H_{17}, CH_2CH\diagdown_{C_4H_9}^{C_2H_5},$$

$$C_9H_{19}, C_{10}H_{21}, C_{11}H_{23}, C_{12}H_{25}, C_{13}H_{27}, C_6H_{12}OH,$$

$$CH-(CH_2)_3-\underset{\underset{CH_3}{|}}{\overset{\overset{CH_3}{|}}{C}}OH, (CH_2)_3OCH_2CH\diagdown_{C_4H_9}^{C_2H_5}$$

and $CH_2CH_2OCOC_7H_{15}$; and
  X is hydroxy or

with air in an organic solvent containing an iron tetraaza(14)annulene catalyst.

2. In a method of dyeing mineral oil products, fats and waxes, the improvement which comprises using a fluid formulation of an oxidation dye which is obtained by oxidizing a compound of the formula:

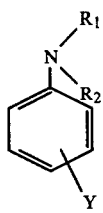

where $R_1$ is unsubstituted or hydroxy-, $C_1$-$C_8$-alkoxy-, or $C_1$-$C_8$-alkanoyloxy-substituted $C_2$-$C_{13}$-alkyl, $R_2$ is hydrogen or unsubstituted or hydroxy- or $C_1$-$C_8$-alkoxy-substituted $C_1$-$C_{13}$-alkyl and Y is hydroxyl, amino, or $NR_1R_2$, with air in an organic solvent containing an iron tetraaza(14)annulene catalyst.

3. The formulation of claim 1 wherein said compound has the formula:

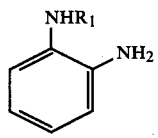

4. The formulation of claim 1 wherein said compound has the formula:

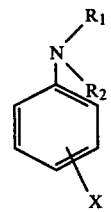

5. The formulation of claim 4 wherein $R_1$ is selected from the group consisting of $C_6H_{13}$, $C_7H_{15}$,

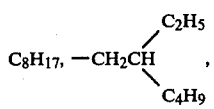

$C_9H_{19}$, $C_{10}H_{21}$, $C_{11}H_{23}$, $C_{12}H_{25}$, $C_{13}H_{27}$, $C_6H_{12}OH$,

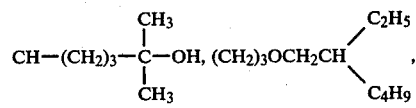

and $-CH_2CH_2OCOC_7H_{15}$.

6. A fluid formulation as claimed in claim 1 which is obtained from a compound of the formula:

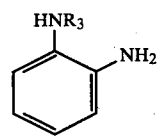

7. The method of claim 2 wherein said formulation is prepared with a compound of formula:

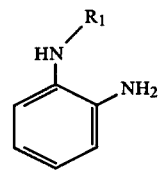

* * * * *